Nov. 8, 1960    W. T. BAGGETT    2,959,333
FISH STRINGER ATTACHMENT
Filed Feb. 3, 1958
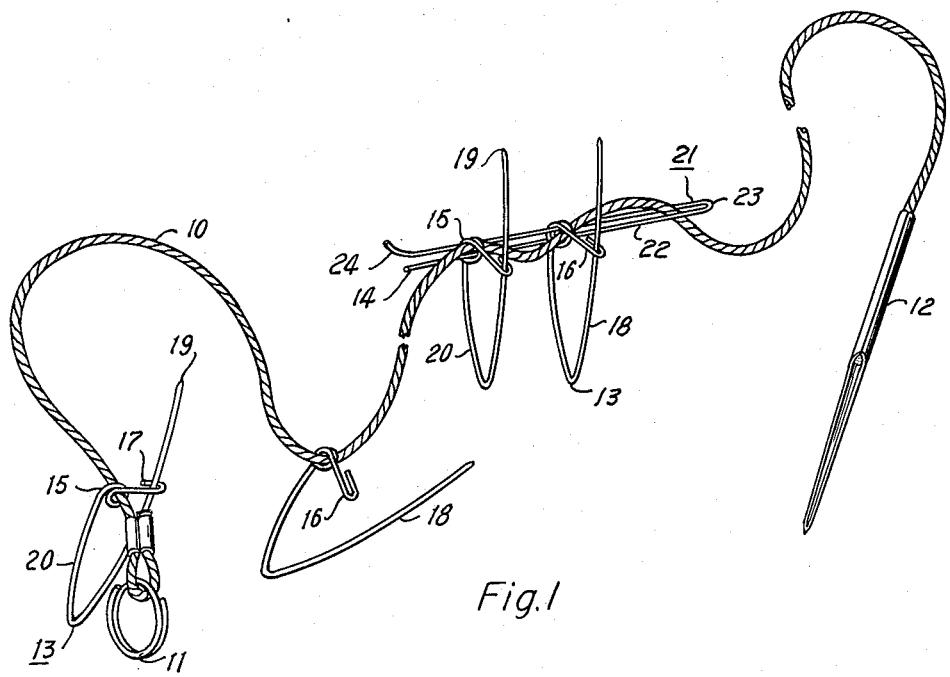
Fig. 1
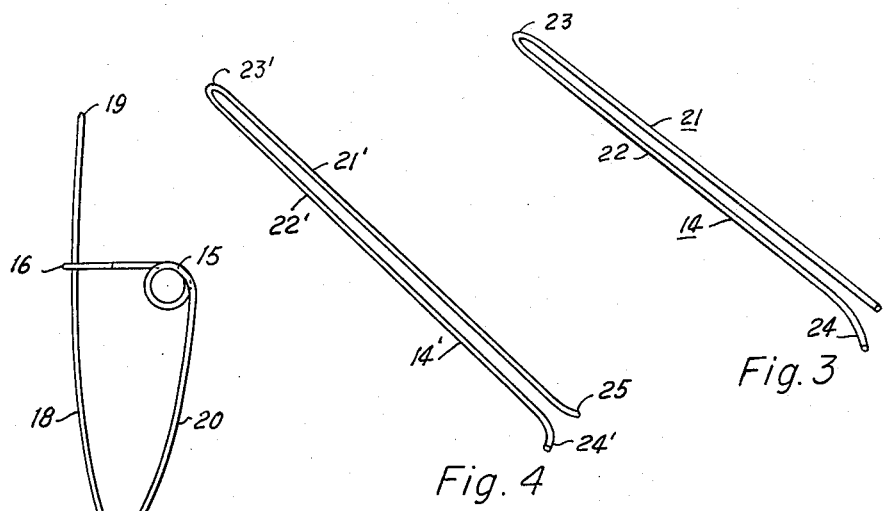
Fig. 2
Fig. 4
Fig. 3
INVENTOR
William T. Baggett
BY  Ashley & Ashley
ATTORNEYS 2,959,333
Patented Nov. 8, 1960

2,959,333
FISH STRINGER ATTACHMENT

William T. Baggett, 5934 Abrams Road, Dallas 31, Tex.

Filed Feb. 3, 1958, Ser. No. 712,945

6 Claims. (Cl. 224—7)

This invention relates to new and useful improvements in attachments for fish stringers.

One object of the invention is to provide an improved attachment for a fish stringer which is of such construction that the same may be readily mounted on a conventional stringer to facilitate connecting fish thereto in a novel manner.

Another object of the invention is to provide an improved fish stringer attachment which includes a plurality of clips adapted to be threaded on the line of the stringer and on retainer means removably attached to the line whereby the clips are held against displacement and permitted to be slipped off of the retainer means for individually stringing fish on the line.

A further object of the invention is to provide an improved fish stringer attachment, of the character described, wherein the retainer means is of narrow hairpin or U-shape for frictional engagement with the stringer line and clips, each clip having an eye for threading over the line and retainer means and a prong for piercing the lower jaw of a fish whereby the fish is permitted limited movement and lives longer than when strung through the gill and mouth.

A construction designed to carry out the invention will be hereinafter described, together with other features of the invention.

The invention will be more readily understood from a reading of the following specification and by reference to the accompanying drawing, wherein examples of the invention are shown, and wherein:

Fig. 1 is a perspective view of a conventional fish stringer having an attachment thereon constructed in accordance with the invention, Fig. 2 is a side elevational view of one of the clips, Fig. 3 is a perspective view of the retainer, and Fig. 4 is a perspective view of a modified retainer.

In the drawing, the numeral 10 designates the cord or line of a conventional fish stringer having a ring 11 suitably fastened to one end and an elongated tip 12 fixed on its opposite end. The tip is similar to an awl or needle for inserting through the gills and mouths of fish and then through the ring to string and confine the fish on the line. Although the tip 12 may be forced through the lower jaws of the fish, this is not customary due to the difficulty of sliding the fish along the line. The fish quickly die when strung through the gills and mouths and tend to bunch when strung directly on the line 10 in any manner. In order to facilitate the stringing of a plurality of fish on the line without crowding and unnecessarily shortening their lives, the novel attachment of the present invention has been provided.

The attachment includes a plurality of clips or fasteners 13 for individually stringing fish on the line and a coacting holder or retainer 14 for confining the clips against sliding movement. Preferably, the clips and retainer are formed of spring wire and are bent to the desired shapes. As shown most clearly in Fig. 2, each clip 13 includes an eye or loop 15 and an adjacent, U-shaped hook 16, having a short bill 17, extending laterally from the eye. An elongated prong 18 is adapted to be confined by the hook 16 and has its free end extending an appreciable distance therebeyond. Preferably, the outer extremity of the prong is pointed as shown at 19. The prong 18 forms one leg of a V-shaped body or portion 20 which has its opposite leg connected to the eye 15. As shown in Fig. 1, the clips 13 are threaded by their eyes on the stringer line for sliding movement.

The clip retainer 14 includes a hairpin or U-shaped body 21 having closely-spaced legs 22 which diverge slightly from their connected ends to their outer free ends. Although shown rather elongated, it is noted that the length of the legs is subject to variation. The retainer is adapted to be removably attached to the line with its legs extending longitudinally thereof toward the ring 11 whereby its bight portion 23 is directed toward the tip 12. It is pointed out that the spacing between the legs is such that their inner portions frictionally engage or clamp the line therebetween, while their outer portions frictionally engage the eyes 15 of the clips 13.

The eyes of the clips are adapted to be threaded over the bight portion 23 of the retainer body 21 and held against sliding movement by the diverging legs 22. In order to resist displacement of the clips from the retainer, one of the legs is of greater length than the other and has its extremity extending laterally outward at an obtuse angle to provide a projection 24. Although resisting the sliding of the clips off of the retainer, the eyes 15 may be manually slipped over the projection 24 and this disengagement is facilitated by inward contraction of the legs. If desired, an outward, lateral projection 25 may be formed on the shorter leg as well as on the longer leg as shown in Fig. 4. Since the modified retainer is otherwise identical, the same numerals have been primed to identify the same parts.

It is readily apparent that a plurality of clips 13 may be frictionally confined upon the retainer 14 or 14' and may be readily slipped therefrom over the projection or projections 24' and 25 whenever it is desired to string a fish. The point 19 of each prong 18 permits piercing of the lower jaw of a fish so that it will live longer and remain fresh and lively. The fish are individually connected to the stringer line 10 by the clips and may swim about with their mouths closed and not become sick due to the sliding of the eyes 15 on said line. The retainer may be quickly attached to and removed from the line and, when attached, is in position for receiving additional clips which may be readily threaded over its bight portion 23. Since one of the legs of the retainer body 21 or 21' is of less length than the other leg, the clips may be threaded over the outer ends of the legs by pressing the same together. It is noted that the V-shaped body 20 of each clip has its legs extending at an acute angle to each other for tight wedging engagement with the lower jaw of a fish which is thicker on the outside than on the inside and which tends to urge the prong 18 outwardly into more positive engagement with the hook 16. It is contemplated that the size of the clips and retainer as well as the diameter of the wire may be varied for large or small fish. Since the ring 11 confines the clips on the line, it is unnecessary to loop said line through said ring. As a result, the effective length of the line is increased.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with a fish stringer having a line with a ring at one end and an elongated tip at its opposite end, an attachment including a plurality of clips having eyes threaded on the line so as to be slidable thereon between the tip and ring, each clip having means for piercing the lower jaw of a fish to string the fish individually, and a U-shaped clip retainer body having closely-spaced legs extending longitudinally of the line and frictionally engaging the line and eyes of the clips to resist displacement of said clips.

2. A fish stringer attachment as set forth in claim 1 wherein one of the legs of the clip retainer body is longer than the other leg and has a lateral projection at its outer end to resist displacement of the clips and permit slipping of the eyes of said clips thereover upon inward contraction of the legs.

3. A fish stringer attachment as set forth in claim 1 wherein the legs of the clip retainer body diverge from their connected ends toward the ring of the stringer.

4. A fish stringer attachment as set forth in claim 1 wherein each clip includes a V-shaped body having legs diverging from an acute apex, the eye of each clip being at the outer end of one leg, and a hook extending laterally from said eye toward and detachably engaging the other leg.

5. In combination with a fish stringer having a line with a ring at one end and an awl-like tip at its opposite end, an attachment including a retainer body of substantially hairpin shape having closely spaced legs extending longitudinally of the line, and a plurality of fasteners having means threaded on the retainer body and line for sliding movement thereon, each fastener having prong means for individually stringing a fish, the legs of said retainer body frictionally engaging the fasteners and line to resist displacement of said fasteners.

6. A fish stringer as set forth in claim 5 wherein each fastener means includes an eye, and means adjacent the eye for confining the prong means.

References Cited in the file of this patent

UNITED STATES PATENTS

| | | |
|---|---|---|
| 1,002,054 | Franks | Aug. 29, 1911 |
| 1,489,194 | Connolly | Apr. 1, 1924 |
| 1,728,560 | Goshorn | Sept. 17, 1929 |
| 2,427,715 | Cooper | Sept. 23, 1947 |
| 2,473,348 | Sharps | June 14, 1949 |
| 2,594,620 | Braithwaite | Apr. 29, 1952 |
| 2,604,243 | John | July 22, 1952 |
| 2,651,135 | Greenleaf | Sept. 8, 1953 |
| 2,662,257 | Milan et al. | Dec. 15, 1953 |